United States Patent [19]
Beale

[11] Patent Number: 5,828,710
[45] Date of Patent: Oct. 27, 1998

[54] AFC FREQUENCY SYNCHRONIZATION NETWORK

[75] Inventor: Terrance Ralph Beale, Kokomo, Ind.

[73] Assignee: Delco Electronics Corporation, Kokomo, Ind.

[21] Appl. No.: 570,213

[22] Filed: Dec. 11, 1995

[51] Int. Cl.[6] .................................................. H04L 27/06
[52] U.S. Cl. ......................................... 375/344; 375/355
[58] Field of Search ........................... 375/316, 344–345, 375/354–355; 370/203, 210, 345, 498, 503; 455/205, 208

[56] References Cited

U.S. PATENT DOCUMENTS

| | | | |
|---|---|---|---|
| 4,577,334 | 3/1986 | Boer et al. | 375/344 |
| 4,584,710 | 4/1986 | Hansen | 455/226 |
| 5,500,878 | 3/1996 | Iwasaki | 375/344 |
| 5,544,200 | 8/1996 | An | 375/344 |
| 5,608,764 | 3/1997 | Sugita et al. | 375/344 |

FOREIGN PATENT DOCUMENTS 092006542   4/1992   WIPO .................................. 375/344

OTHER PUBLICATIONS

Digital Sound Broadcasting to Vehicular, Portable, and Fixed Receivers For BSS (Sound) in the frequency range 500–3000 MHz, Document 10/30–E, 10Dec. 1991.

Digital Sound Broadcasting to Mobile Receivers, Bernard Le Flock, Roselyne Halbert–Lassalle, Damien Castelain, IEEE Transactions on Consumer Electronics, vol. 35,#3, Aug. 1989.

AFC Tracking Algorithms, Francis D. Natali, Transactions on Communications, vol. Com–32, No. 8, Aug. 1984.

Primary Examiner—Young T. Tse
Attorney, Agent, or Firm—Jimmy L. Funke

[57] ABSTRACT

A frequency synchronization network is disclosed that is particularly suited for a Eureka-147 system transmitting synchronization symbols and multiple data carriers, wherein the multiple carriers are transmitted simultaneously and separated from each other by a bin quantity. The network comprises a Fast Fourier transform (FFT) network, a complex rotation device, and a power analyzer. The power analyzer determines the peak condition of the FFT bin quantities and routes this information to an interpolation sequence that determines the zero-crossover condition of the peak bin quantity, and which ultimately determines an output as the frequency offset of the AFC frequency symbol. The frequency offset quantity is provided to an automatic frequency control (AFC) network to provide for frequency locking of the transmitting and receiving elements of the Eureka-147 system.

21 Claims, 7 Drawing Sheets

AFC FREQUENCY SYNCHRONIZATION NETWORK

CROSS REFERENCE TO RELATED U.S. PATENT APPLICATIONS

The present application relates to U.S. patent applications having Ser. Nos. 08/570,456, 08/574,095, and 08/574,096, and having Attorney Docket Nos. H-169,950, H-169,951 and H-169,952 respectively, all of which patent applications are related to a digital audio broadcasting (DAB) system.

FIELD OF THE INVENTION

The present invention relates to a frequency synchronization network that is particularly suited for digital signal processing systems. More particularly, the present invention relates to an automatic frequency control (AFC) synchronization network that is particularly suited for a digital audio broadcasting (DAB) system, such as the Eureka-147 system, that employs multiple carriers transmitted at the same time, which serve as vehicles for transmitting sound information and data information in the form of digital pulses. Specifically, the present invention relates to synchronization symbols carried by the multiple carriers of a Eureka-147 system, and to a synchronization network that decodes these symbols to acquire and maintain a frequency locking condition between the transmitted and received information of the Eureka-147 system.

BACKGROUND OF THE INVENTION

Digital techniques for the transmission and reception of sound information, sometimes referred to as digital audio broadcasting (DAB), have progressed over the past few years and are anticipated, on a worldwide basis, to replace the present frequency modulation (FM) method of transmitting sound. Digital audio broadcasting (DAB) is not only anticipated to replace FM modulation, but also the quality of the sound of such a replacement, reproduced by DAB, will be greatly enhanced, making DAB's acceptance welcomed worldwide.

In order for the digital audio broadcasting technology to be accepted by the broadcasting industry, as well as by the industry that produces the associated electronic equipment, one system that acts as a standard must be chosen so that all participants will know the characteristics of the transmitted and received signals. Some prominent regions and countries, including Western Europe and Canada, have already accepted a system known as Eureka-147, proposed by a European consortium, which is becoming an international standard.

In order for any system, such as the Eureka-147 system, to serve as a standard, it must specify all the requirements of its data management, such as the manner in which the data, in the form of digital pulses representative of sound, is compressed and how its contents may be decoded, as well as the manner in which the data is transmitted and received. The Eureka-147 system employs multiple-carriers transmitted at the same time in the form of a data frame, and formatted in a coded orthogonal frequency division multiplexing (COFDM) modulation scheme.

For any such system, including the Eureka-147 system, it is desirable that the sample rate timing of the receiver be locked into the sample rate of the transmitted information. In FM communication systems, this is accomplished by locking the frequency of the signal receiver to the tuned station's frequency, typically by means of a phase-lock loop (PLL). In DAB systems, this is equivalent to acquiring time and frequency synchronization. One technique for providing time synchronization of transmitted and received information employs a sine-sweep timing technique and is described in U.S. patent application Ser. No. 08/570,456, having Attorney Docket No. H-169,950, and entitled NETWORK FOR TIME SYNCHRONIZING A DIGITAL INFORMATION PROCESSING SYSTEM WITH RECEIVED DIGITAL INFORMATION, which is assigned to the assignee of the present invention, and which patent application is herein incorporated by reference.

A related technique for locking the sample rate of the receiver of a Eureka-147 system to the transmitted information thereof employs a digital phase-lock loop network cooperating with a data buffer. Such a technique employing a digital phase lock loop is described in U.S. patent application Ser. No. 08/574,096, having Attorney Docket No. H-169,952, and entitled DIGITAL PHASE LOCK LOOP NETWORK, which is assigned to the assignee of the present invention, and which patent application is herein incorporated by reference.

A further technique that allows for relation of the timing requirements between the transmitting and receiving elements of the Eureka-147 system employs a differential demodulator that differentially decodes, on a carrier-by-carrier basis, data contained between adjacent carriers in the Eureka-147 system. Such a technique employing a differential demodulator is described in U.S. patent application Ser. No. 08/574,095, having Attorney Docket No. H-169,951, and entitled DIFFERENTIAL DEMODULATOR, which is assigned to the assignee of the present invention, and which patent application is herein incorporated by reference.

The Eureka-147 system accommodates the previously mentioned sine-sweep synchronization technique by having time synchronization symbols placed at the beginning of each data frame transmitted by its transmitter. The sine-sweep network receives the time synchronization symbols for each data frame and utilizes such symbols to provide for time synchronization only. However, because the multiple carriers are transmitted simultaneously in the Eureka-147 system, frequency/phase detectors known heretofore are unable to determine which of the multiple carriers to lock onto. What is therefore needed is a technique for obtaining frequency synchronization in a Eureka-147 system. To acquire such a frequency lock in the Eureka-147 system, the frequency of the receiver's local oscillator is required to be within a frequency range of +/−1/40 of a "frequency bin", or carrier, of the transmitted signal's frequency, which is the frequency separation between each of the multiple carriers.

SUMMARY OF THE INVENTION

In general, the automatic frequency control (AFC) synchronization network of the present invention provides for frequency synchronization between the transmitted and received information thereof. In accordance with one aspect of the invention, a frequency symbol is provided for transmission along with the time synchronization symbols of a Eureka-147 data frame. In accordance with another aspect of the present invention, an AFC synchronization network forms a part of an information receiving system and responds to the frequency synchronization symbol transmitted along with a data frame of the Eureka-147 system to provide frequency synchronization between receiving system and the transmitted data. In accordance with yet another aspect of the present invention, a technique is provided whereby the AFC synchronization network receives the frequency synchronization symbol, that is, the AFC synchronization symbol, and applies computing techniques to derive a frequency standard representative of the frequency of the transmitted data. This frequency standard is then used by the AFC synchronization network to ensure that the transmitted information is received by the receiving system at the proper "operating frequency".

In accordance with one embodiment of the present invention, the AFC synchronization network comprises means for receiving a stream of data including multiple carriers which are separated from each other by a bin quantity having a frequency separation equal to the sampling rate/number of carriers. The AFC synchronization network further comprises means for stripping an AFC frequency symbol from the stream of data, means for performing a fast Fourier transform, means for detecting a peak frequency bin, and means for computing automatic frequency control elements and rotating the computed elements toward and away from a center frequency quantity, linear interpolation means, and an automatic frequency control network.

The AFC frequency symbol is received from the stream of data after time synchronization has been achieved. The information contained in the AFC frequency symbol is routed to the fast Fourier transform which provides a corresponding operation thereon and a corresponding output thereof. The transformed AFC frequency symbol is applied to a power analyzer that determines a peak frequency bin corresponding to the frequency bin in which peak energy occurs, from which is derived a first estimate of the proper operating frequency of the receiving system. The peak frequency bin is thereafter sequentially operated upon to determine a set of alternating sign statistical quantities representative of operating frequency error. A linear interpolation network determines a zero-cross point between the two most recent statistics having opposite signs, which zero-cross-point represents a minimum frequency error. A frequency offset quantity related to the frequency offset between the receiver and the transmitter of the Eureka-147 system is then determined from the minimum frequency error. This frequency offset, along with the first estimate of the operating frequency of the receiving system, is then used by the automatic frequency control network to provide a feedback signal that controls a voltage or numerically controlled oscillator (VCO) which cooperates with a mixer to provide a second more accurate estimate of the proper operating frequency of the receiving system. In this manner, the data transmitted by the transmitter of the Eureka-147 is received at the proper frequency by the receiver elements of the Eureka-147 system.

It is, therefore, a principal object of the present invention to provide for a digital signal processing system, such as the Eureka-147 system, that utilizes a new synchronization symbol for providing frequency synchronization.

Another object of the present invention is to provide a frequency synchronization network that utilizes such a synchronization symbol to determine accurate frequency synchronization between the transmitting and receiving elements of the Eureka-147 system.

Other objects of the present invention, as well as advantages existing over prior art forms, will become apparent in view of the following description.

DESCRIPTION OF THE FIGURES

FIG. 2 is composed of FIGS. 2A, 2B, 2C and 2D and illustrates a frame structure, in accordance with one aspect of the present invention, of the stream of digital information transmitted by the transmitter of FIG. 1 and received by the receiver front end also shown in FIG. 1.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
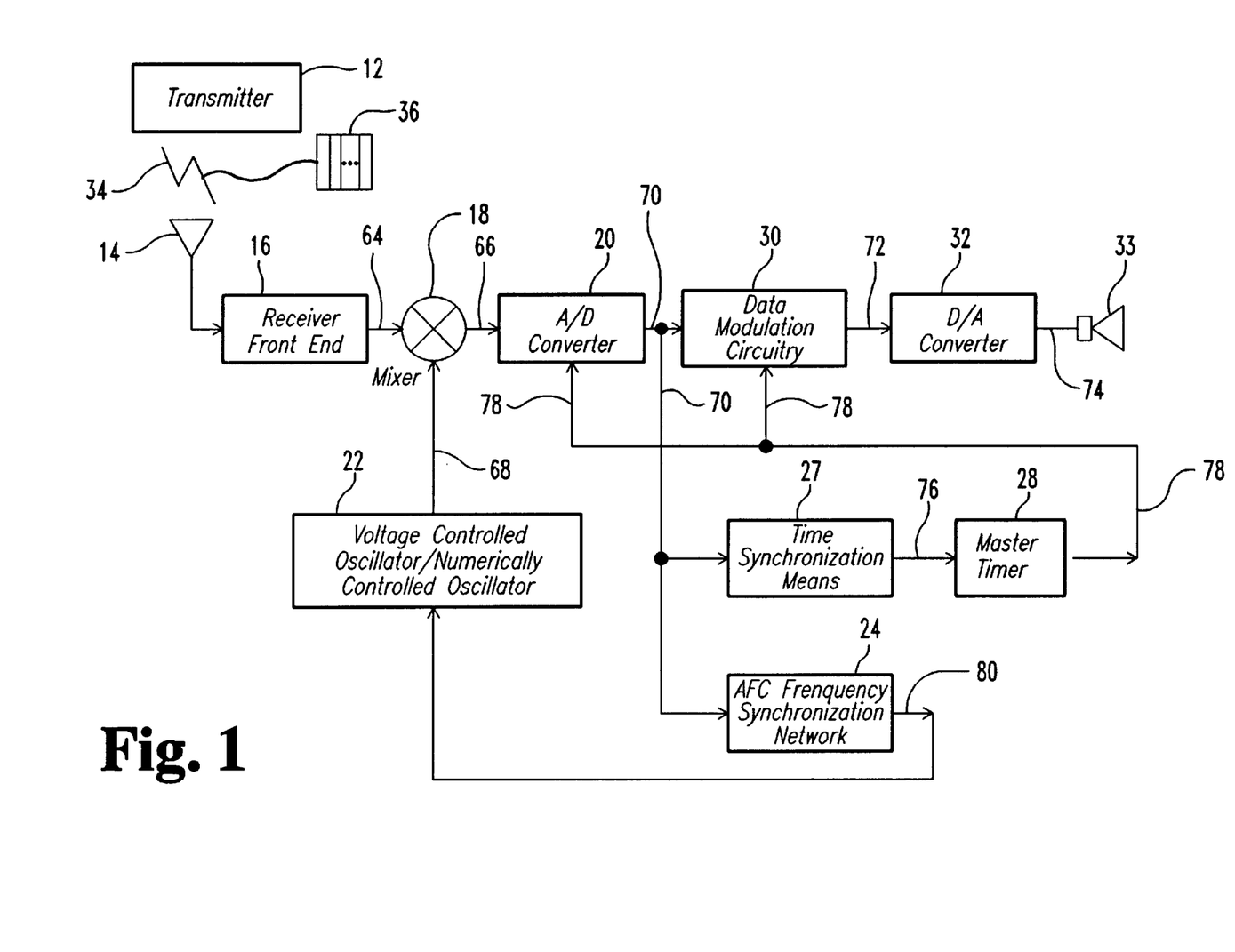
FIG. 1 is a block diagram of a DAB system of the present invention particularly suited for the Eureka-147 data transmission format.

Referring to the drawings, wherein like numbers designate like elements, there is shown in FIG. 1 a block diagram of a digital processing system 10 whose principles are directly applicable to the Eureka-147 system discussed in the "Background" section. The Eureka-147 system serves as at least one standard for the new digital broadcast technology known as "Digital Audio Broadcasting" (DAB). The DAB is anticipated as replacing the FM modulation method for the transmission and reception of sound information and includes a range of sound frequencies from approximately 20 to 20,000 Hz.

The Eureka-147 system employs multiple carriers that are transmitted simultaneously by a modulation scheme referred to as coded orthogonal frequency division multiplexing (COFDM), which is described in the technical article "Digital Sound Broadcasting to Mobile Receivers", of B. LeFloch et al., published in the *IEEE Transactions* on Consumer Electronics, Vol. 35, No. 3, August, 89. The Eureka-147 system is operable in three modes (I, II, and III). A general definition of each of the three operational modes is given in Table 1.

TABLE 1

| EUREKA-147 SYSTEM OF ABOUT 2 MHZ BANDWIDTH | | | |
| --- | --- | --- | --- |
| | MODE I | MODE II | Mode III |
| TF | 96 ms | 24 ms | 24 ms |
| $T_{NULL}$ | 1.297 ms | 324 µs | 168 µs |
| Ts | 1.246 ms | 312 µs | 156 µs |

TABLE 1-continued

EUREKA-147 SYSTEM OF ABOUT 2 MHZ BANDWIDTH

|   | MODE I | MODE II | Mode III |
|---|---|---|---|
| ts | 1 ms | 250 μs | 125 μs |
| Δ | 246 μs | 62 μs | 31 μs |
| J | 76 | 76 | 153 |
| n | 2048 | 512 | 256 |
| fmax | 325 MHZ | 1.5 Ghz | 3.0 Ghz |
| Active Carriers | 1536 | 384 | 192 |
| Virtual Carriers | 512 | 128 | 64 |
| fsep | 1 kHz | 4 kHz | 8 Khz |
| TBW | 1.536 MHZ | 1.536 MHZ | 1.536 MHZ |
| fsample | 2.048 MHZ | 2.048 MHZ | 2.048 MHZ |

Referring to Table 1,
$T_F$ is the digital information frame duration,
$T_{NULL}$ is the duration of a null symbol,
ts is the useful symbol duration,
Δ is a guard interval duration,
Ts is the overall symbol duration; Ts = ts + Δ,
J is the number of symbols per data frame (the null symbol being excluded),
n is the maximum number of carriers for the considered system bandwidth,
fmax = highest carrier frequency for B = fmax * Ts < 0.08,
Active Carriers = carriers of Orthogonal Frequency Division Multiplexing (OFD) signals that contain information,
Virtual Carriers = carriers with no information
fsep = carrier separation,
TBW = total actual signal bandwidth, and
fsample = sample rate for a Fast Fourier Transform (FFT) opertaion (to be discussed in greater detail hereinafter).

The Eureka-147 system utilizes multiple frequency domain carriers as vehicles for digital information, rather than a single-phase carrier having a high data rate as is known in prior art systems. The use of the multiple carriers to transmit information in the form of digital pulses increases data symbol duration so as to avoid intersymbol interference associated with delay spread of an RF channel. Furthermore, the wide bandwidth reduces the effects of narrow band multipath interference. System 10 forms a part of the present invention in that it includes an automatic frequency control (AFC) synchronization network that provides for frequency synchronization between the digital information receiving system 10 and the multiple carriers transmitted at a particular frequency operating within a prescribed range by the Eureka-147 system, and thereby avoids any data reception, or interpretation, errors.

The Eureka-147 system's employment of multiple carriers is unlike most digital modulating systems that utilize a single carrier and that employs standard frequency locking techniques known in the art, such as Costa's loop and squaring type frequency/phase detectors. Frequency synchronization may be accomplished in the Eureka-147 system, or similar such system, by providing a small overhead of synchronization symbols at the beginning of each data frame, in accordance with another aspect of the present invention, as will be more fully described hereinafter.

The system 10 of the present invention comprises a plurality of elements, as shown in FIG. 1 and generally described in Table 2.

TABLE 2

| REFERENCE NO. | ELEMENT |
|---|---|
| 12 | TRANSMITTER |
| 14 | RECEIVING ANTENNA |

TABLE 2-continued

| REFERENCE NO. | ELEMENT |
|---|---|
| 16 | RECEIVER FRONT END |
| 18 | MIXER |
| 20 | A/D CONVERTER |
| 22 | VOLTAGE/NUMERICALLY CONTROLLED OSCILLATOR |
| 24 | AFC FREQUENCY SYNCHRONIZATION NETWORK |
| 27 | TIME SYNCHRONIZATION MEANS |
| 28 | MASTER TIMER |
| 30 | DATA DEMODULATION CIRCUITRY |
| 32 | D/A CONVERTER |
| 33 | SPEAKER |

Although not specifically shown in FIG. 1, the data demodulation circuitry 30, D/A converter 32, and speaker 33 may comprise further elements making up such circuitry to thereby handle multiple channels, sometimes referred to as stereo channels 1, 2, . . . N. A showing of such a multiple channel arrangement is given in U.S. patent application Ser. No. 08/574,095, having Attorney Docket No. H-169,951.

The transmitter 12 and receiver front end 16, are interconnected by communication link 34 that comprises coded information 36 in the form of a stream of digital data, which may be further described with reference to FIG. 2, composed of FIGS. 2A, 2B, 2C and 2D.

Figure 2A:
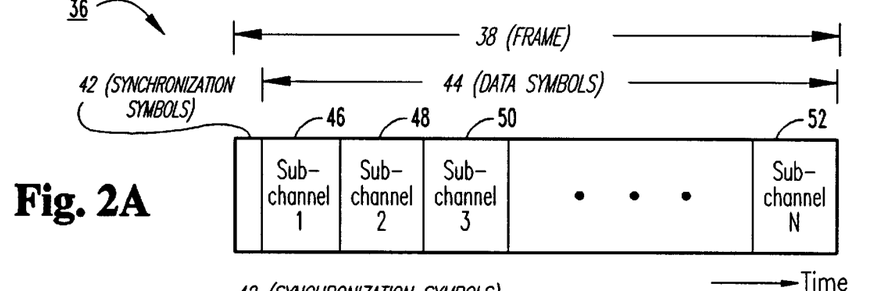

The digital information depicted in FIG. 2A is defined by frames, such as frame 38, having a predetermined duration with a typical duration value of 0.024 seconds (see Table 1, modes II and III). Frame 38 defines a structure having a juxtaposition arrangement that includes synchronization symbols 42 which occur first in time in frame 38, followed by data symbols 44 which are defined by time multiplexed digital sound information for sub-channel 1, sub-channel 2, sub-channel 3 . . . sub-channel N, shown respectively by blocks 46, 48, 50 . . . 52. It is to be understood that the information of sub-channel 1, sub-channel 2, sub-channel 3 . . . sub-channel N can represent stereo/mono audio or data information.

Figure 2B:
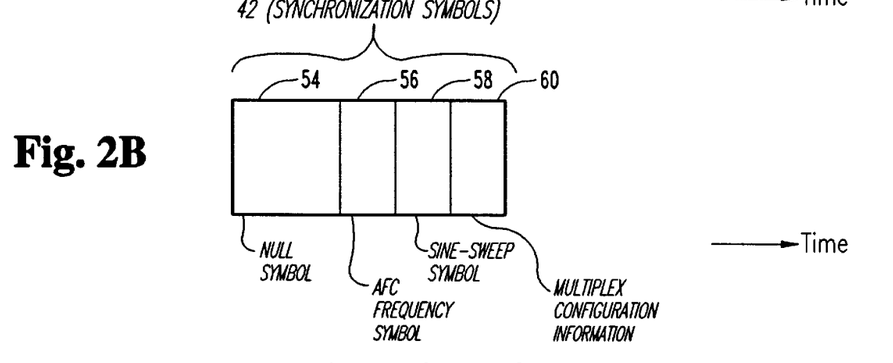

The synchronization symbols 42, shown in FIG. 2B, comprise symbols designated null symbol, AFC frequency symbol, sine-sweep symbol, and multiplex configuration information, and are respectively indicated as 54, 56, 58, and 60. The null symbol 54 and sine-sweep symbol 58 serve as timing information which are added at the beginning of each frame 38 to permit the receiver to time synchronize with the data stream 36. One technique for processing the null 54 and sine-sweep 58 symbols is given in related U.S. patent application Ser. No. 08/570,456, having Attorney Docket No. H-169,950. The AFC synchronization symbol 56 forms one aspect of the present invention and will be more fully described hereinafter.

Figure 2C:
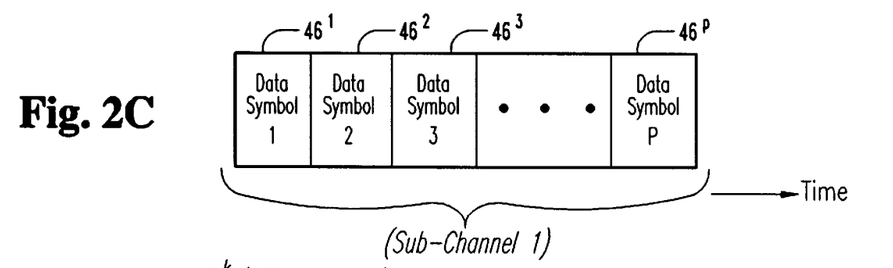
Figure 2D:
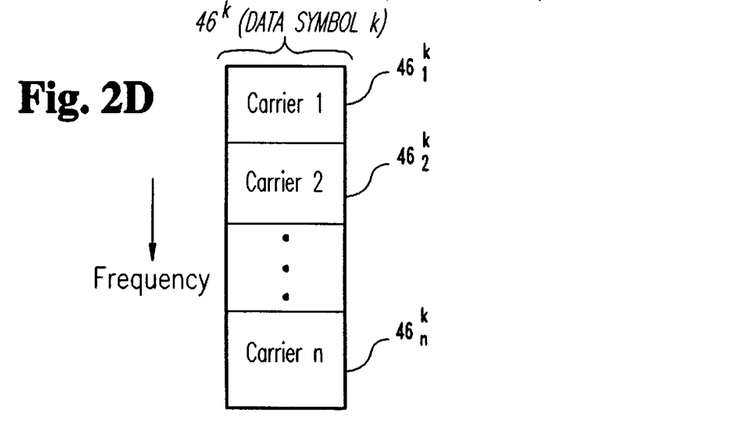

As seen in FIG. 2C, each of the sub-channels, such as sub-channel 1 (46), is further defined as containing multiple adjacent data symbols, data symbol 1, data symbol 2, data symbol 3, . . . data symbol p, respectively shown in blocks $46^1$, $46^2$, $46^3$, and $46^p$. With reference to FIG. 2D, each data symbol, such as the kth data symbol ($46^k$), is further defined as containing multiple carriers, carrier (1), carrier (2), carrier (3), . . . carrier (n), respectively shown in blocks $46^k{}_1$, $46^k{}_2$, $46^k{}_3$, and $46^k{}_n$, wherein the n carriers are spread over a frequency bandwidth of interest (see Table 1). Each of the carriers are phase modulated between adjacent data symbols so that each carrier is phase modulated over time. Thus, each of the n carriers within any given data symbol are transmitted simultaneously, and each of the p data symbols are transmitted at specific discrete time intervals. Frames 38 of data are typically transmitted every 24–96 milliseconds (see Table 1).

Figure 3:
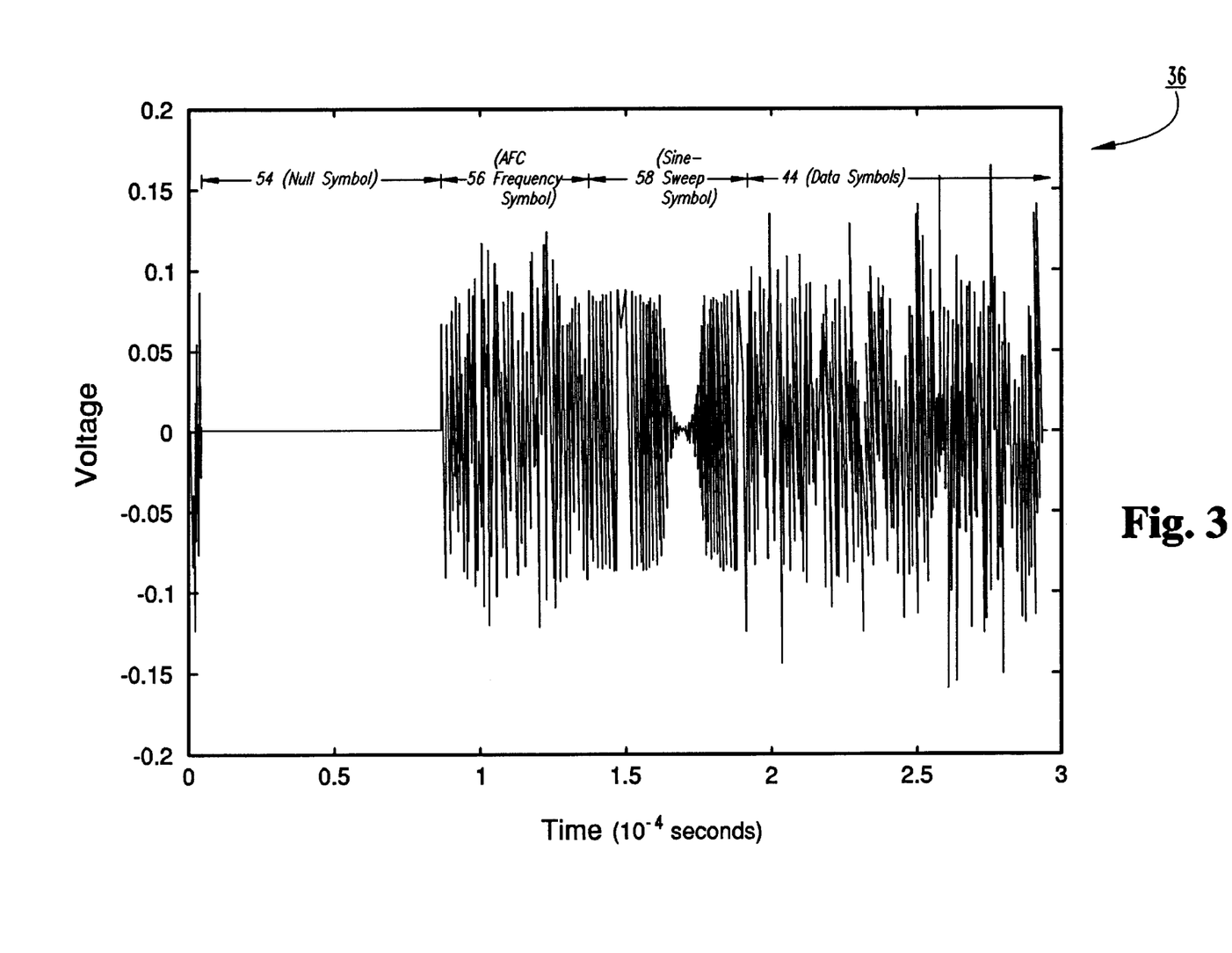
FIG. 3 is a time domain representation of a portion of a digital information frame illustrated in FIG. 2.

In accordance with the present invention, frequency synchronization between system 10 the transmitted data may be achieved with the assistance of a repetitive AFC frequency symbol 56 (ie. one AFC frequency symbol 56 every frame 38). A time domain representation of an example waveform of a stream of digital data 36, also showing the various synchronous symbols 42 therein, is illustrated in FIG. 3. Referring to FIG. 3, the AFC frequency symbol 56, is interposed between the null symbol 54 and sine-sweep symbol 58. The data symbols 44 follow the sine-sweep symbol 58. The AFC frequency symbol 56 is constrained by the tolerance in which the wide-band digital receiver 16 of system 10 (FIG. 1) should be able to acquire frequency synchronization. This constraint may be considered a frequency-acquisition range of the receiver. The Eureka-147 system definition requires that the receiving elements of its system be able to acquire a frequency-lock condition as long as the received frequency is within±eight (8) "frequency bins" of the transmitted frequency. The term "frequency bin", as used herein, is defined as a frequency band having a discrete carrier frequency centered therein, wherein the frequency band width is equal to the frequency separation $f_{sep}$ (Table 1) between adjacent carriers ($46^k_{1-n}$) within any given data symbol ($46^1_p$). In the mode III (shown in Table 1, wherein n=256 carriers) this frequency-lock condition corresponds to +/−(8* 8 kHz)=+/−64 kHz. The AFC frequency symbol definition of the present invention may, however, be altered to accommodate any frequency-lock condition or range that may be desired. In order for the transmitted information 36 to be properly received by the receiving system 10 of FIG. 1, the operating frequency of the receiving system 10 is required in a Eureka-147 system to be within at least±1/40 of a frequency bin of the frequency of the transmitted digital information 36. Frequency synchronization between the receiving system 10 and the transmitted digital information 36 is accomplished by the present invention's utilization of the AFC frequency symbol 56. In order to accomplish such a frequency-lock condition, system 10 includes an AFC frequency synchronization network 24 as shown in FIG. 1.

Referring back to FIG. 1, the stream of digital data 36, illustrated in FIG. 2 and having the time domain representation of FIG. 3, is transmitted by transmitter 12 and received by the receiving antenna 14 via communications link 34 which, in turn, routes the received information to the receiver front end 16. The receiver front end 16 applies its output to a first input 64 of mixer 18. The mixer 18 generates, at its output 66, frequency-controlled analog signals that are routed to the A/D converter 20. The analog, signals so routed to the A/D converter 20 are developed by the mixer 18 in response to the mixing of two input signals, one of which is present at its first input 64, and the other of which is present at a second input 68, which is developed by a voltage (preferably) or numerically controlled oscillator 22 and applied to the mixer 18.

The A/D converter 20 is responsive to the analog signals provided by mixer 18 to convert the analog signals to digital signals and route such digital signals to data modulation circuitry 30 by way of signal path 70. The A/D converter 20 and data modulation circuitry 30 may be of conventional types that operate in a known manner to retrieve and gather digital information being transmitted by the transmitter 12. The data modulation circuitry 30 provides representative digital audio signals that are routed to D/A converter 32 via signal path 72 which, in turn, routes analog audio signals to a speaker 33 via signal path 74. The speaker 33 reproduces the audio signals with a high quality representative of the digital audio broadcasting (DAB) technology related to the present invention. The correct frequency of the signal applied to the A/D converter 20 is controlled by the operation of the voltage/numerically controlled oscillator 22 and AFC frequency synchronization network 24, whereas the proper sampling of information retrieved by data modulation circuitry 30 and handled by the D/A converter 32 is controlled by the operation of time synchronization means 27 and master timer 28.

The time synchronization means 27 responds to the signal present on signal path 70 in such a manner as to supply an appropriate timing signal that is routed to master timer 28 by way of signal path 76. In turn, the master timer 28 provides the appropriate timing information on signal path 78 that permits the A/D converter 20 and the data modulation circuitry 30 to sample the correct data portion 46 of the stream of digital data 38 (FIG. 2). The time synchronization means 27 may be of a conventional COFDM time synchronization type, but is preferred to be the sine-sweep synchronization network described in U.S. patent application Ser. No. 08/570,456, having Attorney Docket No. H-169,950. If the sine-sweep synchronization network is used, only the associated circuitry thereof that provides the correct sampling timing signal for master timer 28 need be implemented. Frequency synchronization between the transmitted and received information can be accomplished in the present invention using the same sine-sweep synchronous hardware to thereby provide the AFC frequency synchronization network 24.

The AFC frequency synchronization network 24, in a manner to be more fully described with reference to FIG. 7, accepts the information present on signal path 70, in particular the AFC frequency symbol 56 (FIGS. 2 and 3), and uses such an AFC frequency symbol 56 to generate a synchronization frequency representative of the frequency transmitted by transmitter 12. Network 24 applies the synchronization frequency signal, in the form of a feedback signal, to the voltage/numerically controlled oscillator 22 on signal path 80 which, in turn, provides for a signal on signal path 68 that assists in the operation of mixer 18 as previously described.

Figure 4:
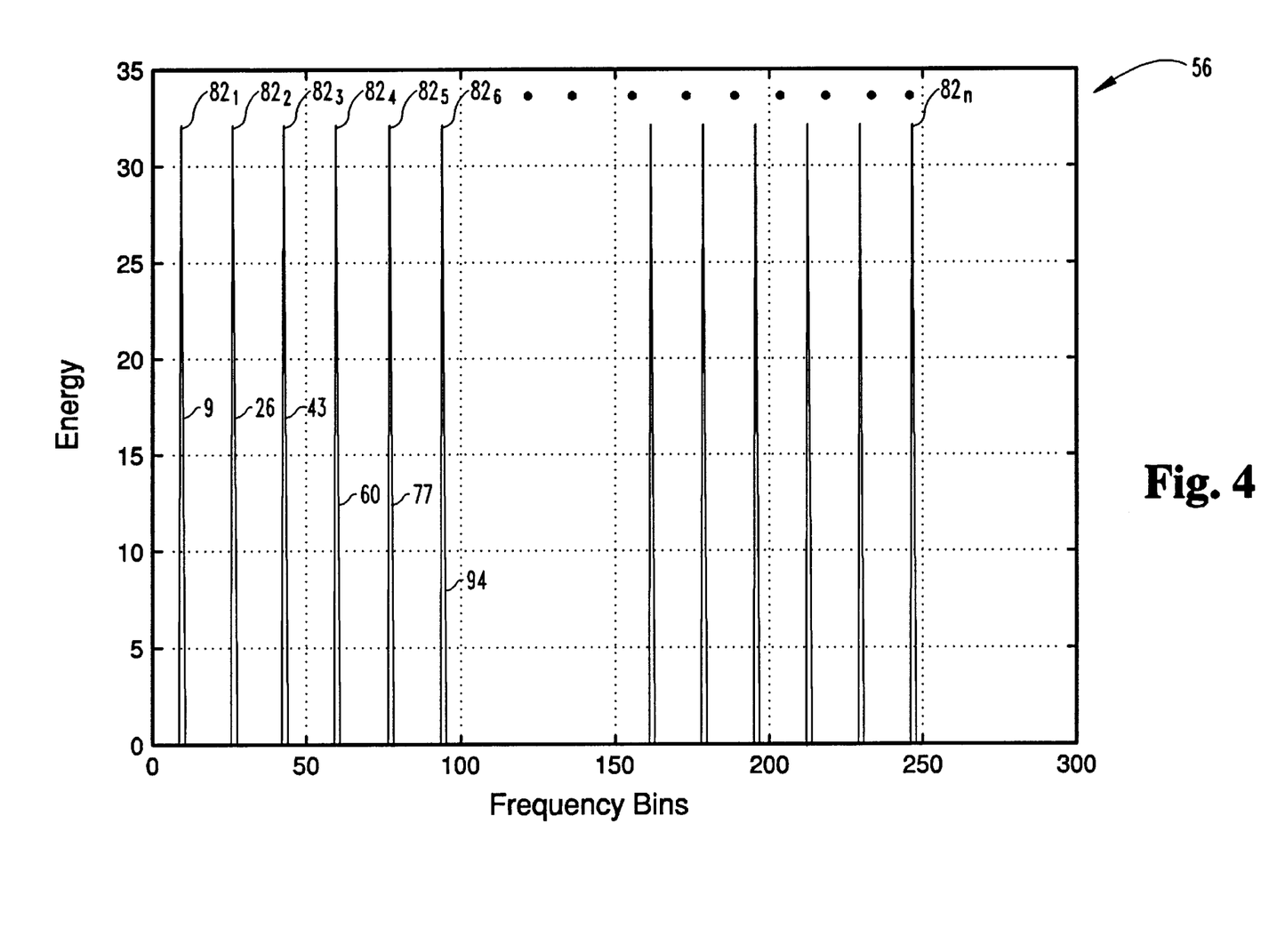
FIG. 4 is a frequency domain representation of the AFC frequency symbol forming a part of the present invention.

The AFC frequency symbol 56 that controls the operation of the AFC frequency synchronization network 24 may be further described with reference to FIG. 4 which illustrates a frequency domain representation of the AFC frequency symbol 56. Referring to FIG. 4, the AFC frequency symbol 56 is illustrated as comprising a plurality of impulse signals $82_1, 82_2, 82_3, 82_4, 82_5, 82_6 \ldots 82_n$, wherein each impulse signal has energy approximately centered about a discrete frequency and contained within a frequency bin. The first six of such signals are respectively designated 9, 26, 43, 60, 77 and 94 to thereby identify a corresponding carrier number associated therewith, as will be subsequently discussed. As previously mentioned, the receiver elements of the Eureka-147 system should be able to acquire a frequency-lock condition if within a frequency range of +/−eight (8) frequency bins of the frequency of the transmitted digital information 36. For such a frequency-lock range, the AFC frequency symbol 56, generally illustrated in FIG. 4, is defined as a limited subset of frequency bins in which every 17th carrier of the total array (e.g., 255) of multiple carriers (FIG. 2C) has energy, beginning with the 9th carrier (peak $82_1$), and skipping bins 97–159 for bandpass filtering on the outer edge of the multi-carrier array. One of the frequency bins of the AFC frequency symbol 56, namely a peak frequency bin, will have a peak energy associated therewith, such that the discrete frequency corresponding to the peak frequency bin corresponds to the approximate transmission frequency of the frame of digital information 38. Finally, the energy of each frequency bin has a complex phase associated therewith, wherein the complex phase is dependent upon a carrier number of the multiple adjacent carriers. More specifically, a special phase assignment $f_k$ is provided by an inverse fast Fourier transform operation such that the AFC frequency symbol information is represented in the frequency domain by the equation:

$$\Phi_k = \exp(i\pi k^2/n) \qquad (1),$$

wherein k is the number of the frequency bin, or the number of the carrier frequency (0, 1, 2, . . . n) of the Eureka-147 system, and n is the total number of the multiple carriers used in the particular application (see Table 1). Such a phase assignment is not required in the use of the AFC frequency symbol, although its use is advantageous in that it minimizes the number of symbol peaks.

The foregoing phase assignment of the AFC frequency symbol 56 is identical to that used for the sine-sweep symbol 58 as described in related U.S. patent application Ser. No., having Attorney Docket No. H-169,950. However, the sine-sweep symbol 58 as defined in the Eureka-147 system cannot be used for both frequency and time synchronization since both affect the matched filtering operation for the timing information in the same manner. Thus, ambiguity in both time and frequency will not allow for precise timing or frequency information if neither are known. If, however, the AFC frequency symbol 56 and sine-sweep symbol 58 are isolated as shown in FIG. 3, the matched filter response for the subset of carriers used in the AFC frequency symbol 56 will not false trigger the timing information of the sine-sweep symbol 58 even though the same phase assignement is used for each symbol.

The operation of the AFC frequency synchronization network 24 which utilizes the AFC frequency symbol 56 may be described with reference to FIG. 5, which is composed of FIGS. 5A and 5B. Referring to the flowchart of FIG. 5A, the operation of network 24 begins at step 86 with a fast Fourier transform, which is performed on the AFC frequency symbol 56 time domain information. At step 88, a search is performed in the frequency domain of the transformed symbol 56 for the frequency bin having greatest energy. Such a frequency bin may be referred to as the peak frequency bin, which has a discrete frequency associated therein which may, in turn, be referred to as a peak frequency. In the operation of receiving system 10, this peak frequency represents a first rough estimate of the operating frequency of system 10 required to synchronize with the frequency of the transmitted digital information 36. The operation of Steps 86–88 allows voltage or numerically controlled oscillator 22 to be driven by system 10 into a range of within +/−1 frequency carrier separation (e.g. mode III=8 kHz) of the transmitted signal, although more precise frequency synchronization is required by the Eureka-147 as previously indicated, and which more precise frequency synchronization by system 10 will be more fully described hereinafter.

After such a peak energy determination, the time domain data points of the AFC frequency symbol 56 are then rotated at step 90. Preferably, the rotation is accomplished by complex mutliplying the time domain data points, which has the effect of moving or rotating the frequency bins of the frequency domain AFC frequency symbol 56 about the peak frequency bin, and shifting the rotated bins such that the peak frequency bin is located at approximately the center frequency bin in the range of frequency bins.

Figures 5A, 5B:
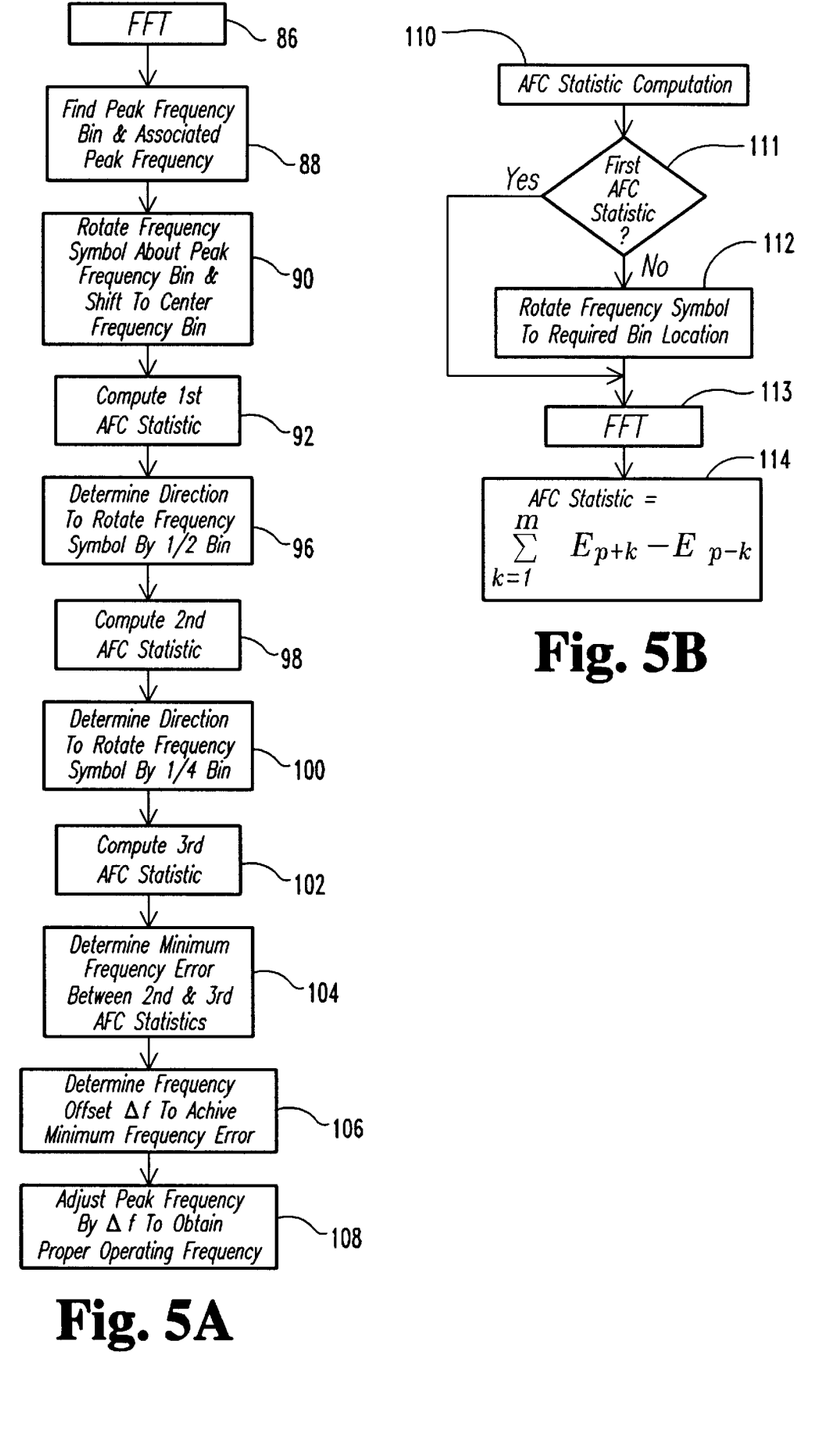
FIG. 5A is a flow chart illustrating one method of processing the AFC frequency symbol of FIG. 4, in accordance with the present invention, to acquire frequency synchronization with the transmitted data.
FIG. 5B is a flow chart illustrating one technique for computing the AFC statistic required by the flow chart of FIG. 5A.
Figure 6:
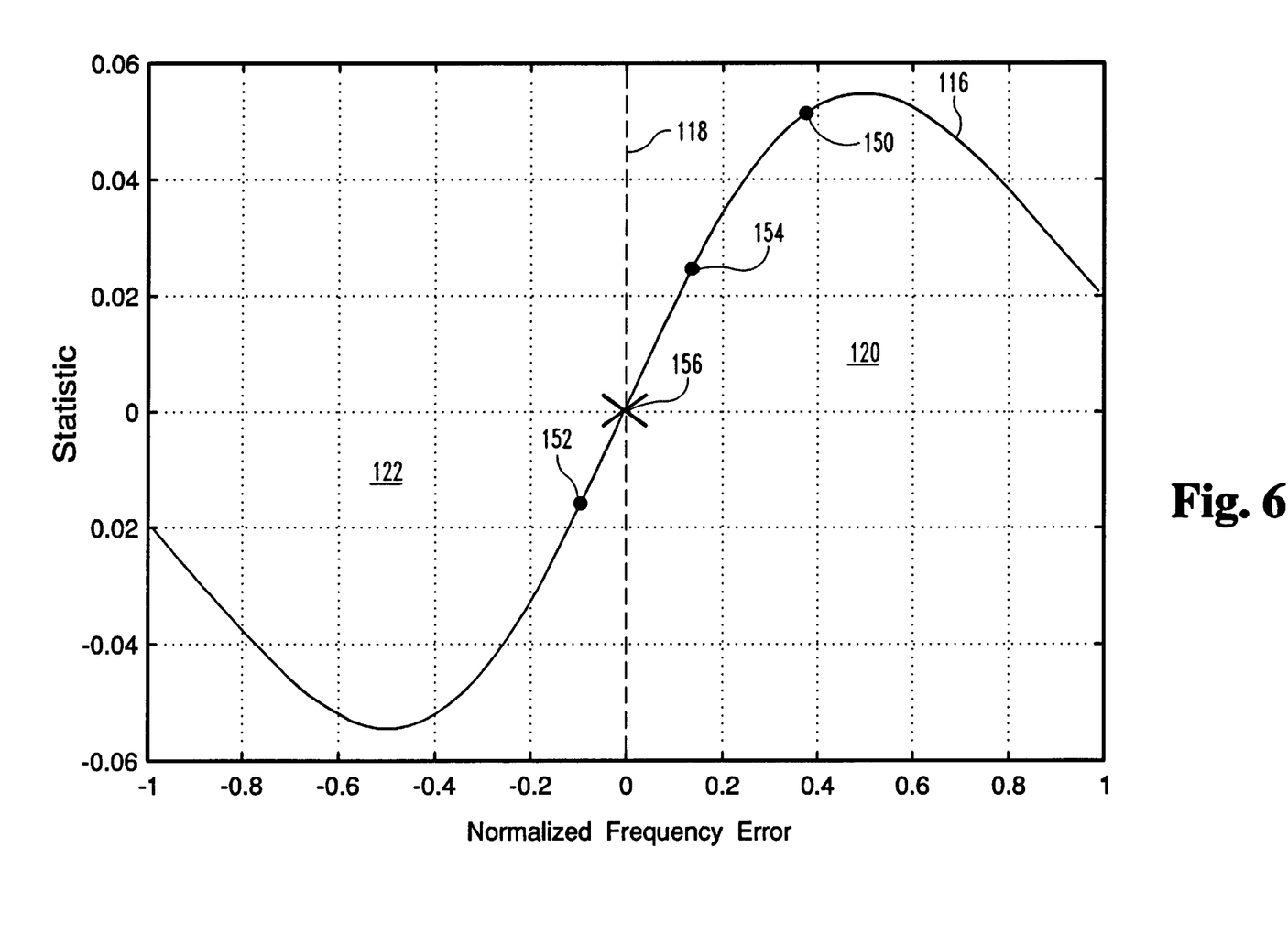
FIG. 6 is an example of an AFC discrimination curve used by the method illustrated in FIGS. 5A and 5B.

At step 92, a first AFC statistic is computed in accordance with the AFC statistic computation routine shown in FIG. 5B. The AFC statistic computation routine of FIG. 5B preferably utilizes a modification of an algorithm described in detail in the technical article "AFC Tracking Algorithms" by Francis D. Natali, and published in the *IEEE Transactions* on Communications, Vol. Com-32, No. 8, August 1984. More particularly, the AFC symbol computation algorithm of FIG. 5B is based on a discrete Fourier transform automatic frequency control (DFTAFC) algorithm detailed in Natali's article. Such a DFTAFC algorithm operates with a multi-frequency shift keyed (MFSK) modulation system in which a single carrier is analyzed in adjacent energy bins that are located +/−½ carrier separations from the "on frequency" carrier in order to compute an error, or frequency discrimination, curve. The "on frequency" carrier, in accordance with Natali's algorithm, is then used as a reference frequency. The algorithm of FIG. 5B extends Natali's DFTAFC algorithm to a multiple carrier scheme wherein several AFC frequency symbol carriers (specifically, every 17th) distributed throughout the entire array of frequency (specifically, 2 MHz bandwitdth) are used to compute the same statistic described in Natali's paper by summing the individual statistic from each of the several AFC frequency symbol carriers to provide a single error statistic represetative of the error contributions attributable to each AFC frequency symbol carrier. More specifically, every seventeenth carrier (i.e. $82_1$, $82_2$, . . . $82n$ of FIG. 4), beginning with the ninth carrier ($82_1$ of FIG. 4) is used to compute such an error statistic. The error statistic is then referenced to a known frequency discrimination curve such as that shown in FIG. 6. Referring to FIG. 6, the frequency discrimination curve 116 has negative values for an entire frequency bin 122 to the left of the center frequency (or carrier) 118, and has positive values for an entire frequency bin 120 to the right of the center carrier 118. Such an extension of Natali's DFTAFC algorithm to an OFDM modulation system, such as Eureka-147, thereby provides a robustness for wide-band reception in which a single carrier is degraded by multipath effects, such as that involved with different arrival times of the transmitted signal at the receiving antenna.

Referring back to FIG. 5B, the AFC statistic computation routine begins at step 110 and at step 111 it is determined whether the first AFC statistic is being computed. If so, the routine continues at step 113. If the first AFC statistic is not being computed, step 111 proceeds to step 112 wherein the previously rotated time domain AFC frequency symbol 56 data points are further rotated to a required bin location, as will be more fully described hereinafter. At step 113, a fast Fourier transform operation is again performed to transform the rotated time domain AFC frequency symbol 56 information to a frequency domain representation thereof. At step 114, the individual AFC statistics of the several AFC frequency symbol 56 carriers are computed and summed. Specifically, the energies of the discrete frequency bins located equidistant from the peak frequency bin on either side thereof are subtracted and these differences are summed to provide the first overall error or AFC statistic in accordance with the equation:

$$\text{AFC Statistic} = \Sigma^m_{k=1} E_{p+k} - E_{p-k} \qquad (2),$$

where p is the frequency bin number corresponding to the peak frequency bin and m is the total number of AFC frequency symbol carriers.

Referring again to FIG. 5A, the algorithm continues from step 92 to step 96 wherein the direction in which to rotate the time domain AFC frequency symbol data points, previously rotated in step 90, by ½ frequency bin is determined in accordance with the value of the first AFC statistic and its location on the frequency discrimination curve of FIG. 6. If, when referenced to the frequency discrimination curve of FIG. 6, the first AFC statistic is positive, then the time domain AFC frequency symbol data points resulting from step 90 are rotated, preferably by complex multiplication, by −½ frequency bin. If, on the other hand, the first AFC statistic is negative, then the time domain AFC frequency symbol data points resulting from step 90 are rotated by +½ frequency bin. Essentially, steps 92 and 96 have the effect of determining, within the peak frequency bin, the direction from the peak frequency in which the actual peak energy in the bin is located. In an example shown in FIG. 6, the first AFC statistic 150 is positive. Thus, at step 96, a determination is made that the time domain AFC frequency symbol data points resulting from step 90 will be rotated by −½ frequency bin.

Continuing now from step 96 to step 98, a second AFC statistic is computed in accordance with the AFC statistic computation algorithm of FIG. 5B, wherein step 111 proceeds to step 112, wherein the time domain AFC frequency symbol data points resulting from step 90 are rotated by +/−½ frequency bin. Thereafter, an FFT operation is performed and the second AFC statistic is computed at steps 113 and 114 respectively, as previously described.

Referring again to FIG. 5A, the algorithm continues from step 98 to step 100 wherein the direction in which to again rotate the time domain AFC frequency symbol data points, previously rotated in step 112, by ¼ frequency bin is determined in accordance with the value of the second AFC statistic and its location on the frequency discrimination curve of FIG. 6. If, when referenced to the frequency discrimination curve of FIG. 6, the second AFC statistic is positive, then the time domain AFC frequency symbol data points resulting from step 112 are rotated, preferably by complex multiplication, by −¼ frequency bin. If, on the other hand, the second AFC statistic is negative, then the time domain AFC frequency symbol data points resulting from step 112 are rotated by +¼ frequency bin. As with steps 92–96, steps 98–100 have the effect of determining, within the peak frequency bin, the direction from the peak frequency in which the actual peak energy in the bin is located. Continuing with the example shown in FIG. 6, the second AFC statistic 152 is negative. Consequently, at step 100, a determination is made that the time domain AFC frequency symbol data points resulting from the most recent execution of step 112 will be rotated by +¼ frequency bin. Due to the nature of the algorithm of FIGS. 5A and 5B, at least two AFC statistics in a sequence thereof will be opposite in sign.

Continuing now from step 100 to step 102, a third AFC statistic is computed in accordance with the AFC statistic computation algorithm of FIG. 5B, wherein step 111 proceeds to step 112 and the time domain AFC frequency symbol data points resulting from the most recent execution of step 112 are rotated by +/−¼ frequency bin. Thereafter, an FFT operation is performed and the third AFC statistic is computed at steps 113 and 114 respectively, as previously described. Continuing with the example of FIG. 6, the third statistic 154 is positive.

Referring again to FIG. 5A, the algorithm continues from step 102 to step 104 wherein a minimum frequency error is determined between the two most recent AFC statistics having opposite signs. It is to be understood, however, that the present invention contemplates that any number of AFC statistics may be computed in accordance with the concepts described with respect to FIGS. 5A and 5B, and that the minimum frequency error may be determined between the two most recently computed AFC statistics having opposite signs. Preferably, the minimum frequency error is determined via known linear interpolation techniques to thereby locate the zero-crossing point therebetween. However, the present invention contemplates that any other known minimum frequency error determination technique may be used in step 104. Once more continuing with the example of FIG. 6, the minimum frequency error 156 corresponds to the zero-crossing point between the second AFC statistic 152 and the third AFC statistic 154. Those skilled in the art, however, will recognize that another example can be constructed wherein the second and third AFC statistics have the same sign, so that step 104 is carried out by determining the minimum frequency error as the zero-crossing point between the first and third AFC statistics. From FIG. 6, it can be appreciated that the minimum frequency error 156 occurs approximately at the true location of the center carrier 118.

The algorithm of FIG. 5A continues from step 104 to step 106 where a frequency offset, Δf, is determined, wherein Δf is the frequency offset from the peak frequency (first estimate of the frequency of the transmitted digital information 36) required to achieve the minimum error. Preferably, the frequency offset Δf is determined as the amount of rotation of the time domain AFC symbol data points resulting from step 88 required to approach the zero-crossing point 156 of FIG. 6.

The algorithm of FIG. 5A continues from step 106 to step 108 where the receiving system 10 adjusts the peak frequency by Δf to provide a second more accurate estimate of the operating frequency of system 10 at which system 10 and the digital information 36 are synchronized in frequency. Preferably, step 108 is carried out by system 10 by controlling voltage/numerically controlled oscillator 22 (FIG. 1) so as to cause system 10 to operate at the specified operating frequency.

As previously discussed, it is desired to obtain a frequency synchronization within±1/40 of a frequency bin of the frequency of the transmitted signal. The information given in FIGS. 5–6, permits the receiver, in particular, the AFC frequency synchronizing network 24, to search and use linear interpolation methods to find a solution to the actual frequency offset related to the frequency of the transmitter 12, and ultimately provide the present invention, this frequency offset $f_o$ is less than±1/40 of a frequency bin so as to serve as a representative quantity that causes the frequency of the receiver elements of FIG. 1 to be locked to the frequency of the transmitter 12, thus assuring the proper reception of the stream of digital data 38 by the receiver elements of FIG. 1. This frequency offset quantity $f_o$ is generated and utilized by a preferred circuit arrangement of FIG. 7, primarily illustrating the AFC frequency synchronization network 24 as being comprised of the plurality of elements described in Table 3.

TABLE 3

| REFERENCE NO. | ELEMENT |
| --- | --- |
| 126 | FAST FOURIER TRANSFORM |
| 128 | POWER ANALYZER |
| 130 | COMPUTE AFC STATISTICS |

TABLE 3-continued

| REFERENCE NO. | ELEMENT |
| --- | --- |
| 132 | ROTATE SAMPLES |
| 134 | PEAK BIN |
| 136 | +/- - BIN |
| 138 | +/- 1.4 BIN |
| 140 | LINEAR INTERPOLATION |
| 142 | AUTOMATIC FREQUENCY CONTROL (AFC) NETWORK |

The AFC frequency synchronization network 24 may be implemented by digital signal processing application specific integrated circuit (DSP/ASIC) technology that includes a memory (not shown) for receiving and holding information for data manipulation purposes. Furthermore, each of the elements given in Table 3 and illustrated in FIG. 7 may comprise a DSP/ASIC performing a function and containing a routine which defines a complete set of instructions for performing an operation, i.e., a program or program segment so as to achieve a predetermined result. The operational routines of the elements shown in FIG. 7 may be those routines described with reference to FIG. 5.

Figure 7:
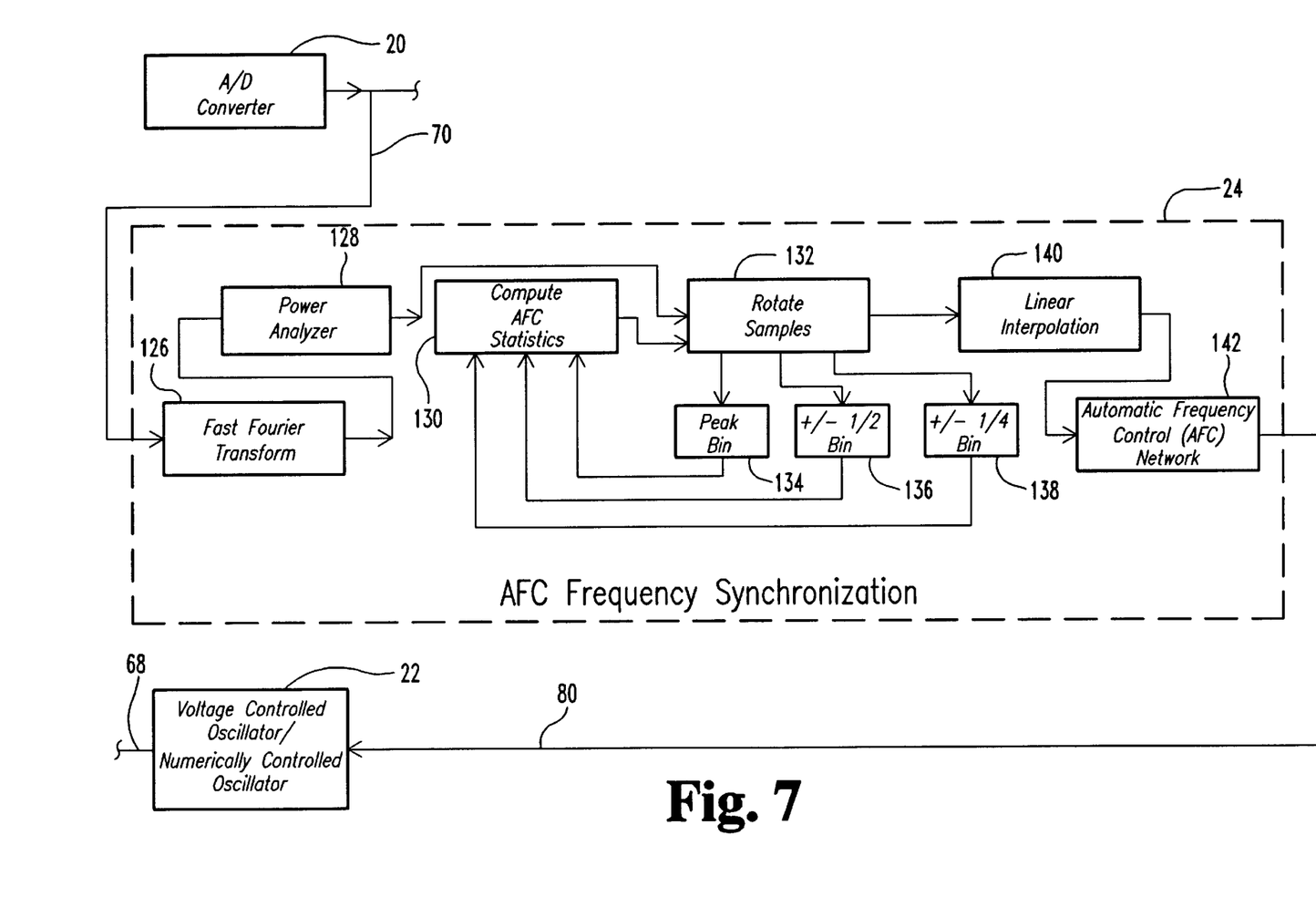
FIG. 7 is a block diagram of one embodiment of an AFC frequency synchronization network forming a part of the present invention.

Referring now to FIG. 7, the automatic frequency control (AFC) network 142 is preferably of a conventional type as known in the art. The linear interpolation circuity 140 produces in the frequency offset quantity $f_o$ previously discussed with reference to FIG. 5 that is routed to the automatic frequency control (AFC) network 142 which, in turn, provides a feedback signal, via signal path 80, that is routed to the voltage or numerically controlled oscillator 22 which, in turn, provides a frequency signal to the mixer 18 via signal path 68 so that the mixer 18, if necessary, may shift the frequency of the receiving elements of FIG. 1 to that of the frequency of the transmitter 12.

It should now be appreciated that the practice of the present invention provides for an AFC frequency synchronization network 24 that decodes the information contained in an AFC frequency symbol 56 provided in the stream of digital data 36, and utilizes such information to create a frequency-lock condition between the transmitting and receiving elements of the Eureka-147 system.

In experimental testing of the concepts of the present invention, the output of the frequency estimation process versus normalized frequency offset, the error due to linear interpolation, and the error of linear interpolation as well as the additive computation needed for the frequency statistics for multiple carriers were investigated. Considering all of these possible error contributors, it was determined that the voltage or numerically controlled oscillator 22 could be held within a desired frequency tolerance of less than 0.02 normalized frequency bins of the transmitted frequency so that the receiver elements of FIG. 1 maintained frequency synchronization to within +/-1/40 normalized frequency bins (or 0.02 normalized carrier bins) of the transmitted frequency. Such frequency synchronization was satisfactorily obtained for transmitted signal-to-noise ratios of 30, 10 and 3 db.

It should now be appreciated that the practice of the present invention provides for an AFC frequency synchronization network 24 that operates using an AFC frequency symbol 56 as its source and produces accurate results so that the frequency of the receiver elements of FIG. 1 are locked to the frequency of the transmitter 12.

It should further appreciated that the practice of the present invention provides for an automatic frequency synchronization network that allows the Eureka-147 system to accurately transmit and receive its digital information.

It should be further appreciated that although the foregoing description of the AFC synchronization network has been primarily described for the Eureka-147 system, it should also be recognized that the principles of the present invention teach the use of the AFC synchronization network that may be used in any type of digital signal processing system.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The embodiments of the invention in which an exclusive property or privilege is claimed are defined as follows:

1. A method of synchronizing the operating frequency of a digital information receiving system with that of received digital information defined by a frequency symbol followed by multiple adjacent data carriers transmitted simultaneously over a predefined frequency range, wherein the frequency symbol has energy at discrete frequency bins distributed throughout the predefined frequency range, the method comprising the steps of:

(1) detecting the frequency symbol and determining therefrom a peak frequency bin corresponding to a frequency bin in which the frequency symbol has peak energy, the peak frequency bin having a discrete frequency associated therewith corresponding to a first estimate of the operating frequency of the received digital information;

(2) computing a statistic of the frequency symbol information, wherein the statistic is positive if the total energy of the frequency bins having higher frequencies than the peak frequency bin is greater than the total energy of the frequency bins having lower frequencies than the peak frequency bin, the statistic being otherwise negative;

(3) performing steps (4)–(5) a predetermined number of times;

(4) rotating the frequency symbol information such that the frequency bins are shifted negatively by a frequency bin fraction if the most recent statistic is positive, and shifted positively by the frequency bin fraction if the most recent statistic is negative;

(5) computing a statistic of the rotated frequency symbol information in accordance with step (2);

(6) determining a minimum frequency error between the two most recent statistics having opposite signs; and (7) controlling the operating frequency of the digital information system in accordance with the first estimate of the operating frequency of the received digital information and the minimum frequency error.

2. The method of claim 1 further including the following step after step (1) but before execution of step (2):

rotating the frequency symbol information about the peak frequency bin and shifting the rotated frequency symbol information such that the peak frequency bin corresponds to a frequency bin located approximately centrally within the predefined frequency range.

3. The method of claim 1 wherein step (1) includes the steps of:

performing a Fast Fourier Transform on the frequency symbol information; and comparing the frequency bin energies of the transformed frequency symbol information and determining therefrom a peak frequency bin corresponding to the frequency bin having highest energy.

4. The method of claim 1 wherein step (2) includes the steps of:
   performing a Fast Fourier Transform on the frequency symbol information; and
   sequentially subtracting energies of frequency bins that are equidistant in frequency from the peak frequency bin on either side thereof, and summing the differences to provide the statistic.

5. The method of claim 1 wherein steps (4)–(5) are performed twice such that the minimum frequency error of step (6) computed after determination of three such statistics.

6. The method of claim 5 wherein the frequency bin fraction of step (4) is 0.5 during the first execution thereof and 0.25 during the second execution thereof.

7. The method of claim 1 wherein the minimum frequency error of step (6) is a zero-crossing point of the two most recent statistics having opposite signs.

8. The method of claim 7 wherein the zero-crossing point is determined via liner interpolation between the two most recent statistics having opposite signs.

9. The method of claim 1 wherein step (7) includes the steps of:
   determining a discrete frequency at which the minimum frequency error occurs;
   computing a frequency offset value corresponding to a difference between the discrete frequency of the peak frequency bin of step (1) and the discrete frequency at which the minimum frequency error occurs; and
   adjusting the discrete frequency of the peak frequency bin of step (1) by the frequency offset value to provide an accurate operating frequency of the digital information receiving system.

10. The method of claim 1 wherein the frequency symbol information is rotated via complex multiplication thereof.

11. A method of synchronizing the operating frequency of a digital information receiving system with that of received digital information defined by a frequency symbol followed by multiple adjacent data carriers transmitted simultaneously over a predefined frequency range, wherein the frequency symbol has energy at discrete frequency bins distributed throughout the predefined frequency range, the method comprising the steps of:
   (1) detecting the frequency symbol and determining therefrom a peak frequency bin corresponding to a frequency bin in which the frequency symbol has peak energy, the peak frequency bin having a discrete frequency associated therewith corresponding to a first estimate of the operating frequency of the received digital information;
   (2) rotating the frequency symbol information about the peak frequency bin and shifting the rotated frequency symbol information such that the peak frequency bin corresponds to a frequency bin located approximately centrally within the predefined frequency range;
   (3) computing a first statistic of the rotated frequency symbol information, wherein the first statistic is positive if the total energy of the frequency bins having higher frequencies than the peak frequency bin is greater than the total energy of the frequency bins having lower frequencies than the peak frequency bin, the first statistic being otherwise negative;
   (4) further rotating the rotated frequency symbol information of step (2) such that the frequency bins are shifted by – ½ frequency bin if the first statistic is positive, and shifted by + ½ frequency bin if the first statistic is negative;
   (5) computing a second statistic of the further rotated frequency symbol information of step (4), wherein the second statistic is positive if the total energy of the frequency bins having higher frequencies than the peak frequency bin is greater than the total energy of the frequency bins having lower frequencies than the peak frequency bin, the second statistic being otherwise negative;
   (6) further rotating the rotated frequency symbol information of step (4) such that the frequency bins are shifted by – ¼ frequency bin if the second statistic is positive, and shifted by + ¼ frequency bin if the second statistic is negative;
   (7) computing a third statistic of the further rotated frequency symbol information of step (6), wherein the third statistic is positive if the total energy of the frequency bins having higher frequencies than the peak frequency bin is greater than the total energy of the frequency bins having lower frequencies than the peak frequency bin, the third statistic being otherwise negative;
   (8) determining a minimum frequency error as a zero crossing point between the two most recent statistics having opposite signs;
   (9) determining a discrete frequency at which the minimum frequency error occurs;
   (10) computing a frequency offset value corresponding to a difference between the discrete frequency of the peak frequency bin of step (1) and the discrete frequency at which the minimum frequency error occurs; and
   (11) adjusting the discrete frequency of the peak frequency bin of step (1) by the frequency offset value to provide second more accurate estimate of the operating frequency of the digital information receiving system.

12. The method of claim 11 wherein step (1) includes the steps of:
   performing a Fast Fourier Transform on the frequency symbol information; and
   comparing the frequency bin energies of the transformed frequency symbol information and determining therefrom a peak frequency bin corresponding to the frequency bin having highest energy.

13. The method of claim 12 wherein steps (3), (5) and (7) each include the steps of:
   performing a Fast Fourier Transform on the frequency symbol information; and
   sequentially subtracting energies of frequency bins that are equidistant in frequency from the peak frequency bin on either side thereof, and summing the differences to provide the statistic.

14. The method of claim 13 wherein the frequency symbol information is rotated via complex multiplication thereof.

15. The method of claim 14 wherein the zerocrossing point is determined via liner interpolation between the two most recent statistics having opposite signs.

16. In combination:
   a frame of digital information defined by a number of sample timing synchronization symbols followed by multiple adjacent data carriers transmitted simultaneously over a predefined frequency range, wherein each of the multiple data carriers is modulated over time; and an automatic frequency control (AFC) frequency synchronization symbol positioned in the frame of digital information adjacent the sample timing synchronization symbols, the AFC frequency symbol comprising:

a number of discrete frequency bins each corresponding to a predetermined one of the multiple adjacent carriers and distributed throughout the predefined frequency range, each frequency bin having an independent energy associated therewith, wherein the number of discrete frequency bins includes a peak frequency bin having greatest energy, the peak frequency bin including a discrete frequency at which the peak frequency bin has greatest energy, the discrete frequency defining a transmission frequency of the frame of digital information.

17. The combination of claim 16 wherein a first one of the frequency bins corresponds to particular one of the multiple adjacent carriers, and each frequency bin thereafter corresponds to a predetermined number of carriers from that of the preceding frequency bin.

18. The combination of claim 17 wherein a predetermined number of sequential frequency bins within the predefined frequency range have no energy.

19. The combination of claim 18 wherein the energy of each frequency bin has a complex phase associated therewith, and wherein the complex phase is dependent upon a carrier number of the multiple adjacent carriers.

20. A frequency synchronizing network for synchronizing a digital information receiving system with received digital information defined by a number of synchronization symbols including an AFC frequency symbol followed by multiple adjacent data carriers transmitted simultaneously over a predefined frequency range, wherein each of the multiple data carriers is modulated over time and the frequency symbol has energy at discrete frequency bins distributed throughout the predefined frequency range, the network comprising:

means for receiving the digital information and transforming information contained in the frequency symbol to a frequency domain-energy distribution representation thereof;

means for receiving the transformed frequency symbol information at its input, determining a peak energy from the energy distribution thereof and corresponding peak frequency bin at which the peak energy occurs, and providing a peak frequency value associated with the peak frequency bin at its output;

means for rotating the frequency symbol information to a particular frequency bin location;

means for determining the particular frequency bin at which to rotate the frequency symbol information;

means for computing an AFC statistic, wherein the statistic is positive if the total energy of the frequency bins having higher frequencies than the peak frequency bin is greater than the total energy of the frequency bins having lower frequencies than the peak frequency bin, the statistic being otherwise negative;

means for determining a minimum frequency error between AFC statistics; and means for synchronizing the operating frequency of the digital information receiving system with that of the received digital information in accordance with the peak frequency value and the minimum frequency error.

21. The frequency synchronizing network of claim 20 wherein the network is formed of a single integrated circuit.

\* \* \* \* \*